Figure 1:
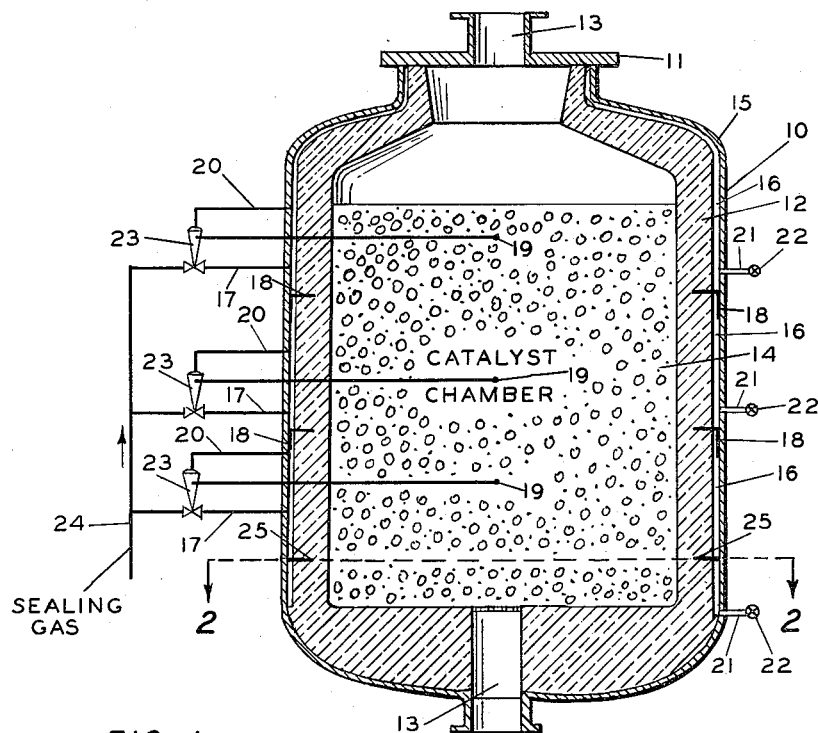

INVENTOR
A. R. REHRIG
BY Hudson and Young
ATTORNEYS

Patented Mar. 13, 1951

2,545,384

UNITED STATES PATENT OFFICE 2,545,384

INSULATION OF CATALYST CHAMBERS

Alexander R. Rehrig, Phillips, Tex., assignor to Phillips Petroleum Company, a corporation of Delaware Application August 5, 1944, Serial No. 548,296

1 Claim. (Cl. 23—288)

This invention relates to apparatus for the conversion of organic compounds by contact with solid catalytic material and particularly to an improvement in catalyst chambers which are internally lined or insulated.

Insulation of vessels is conventionally obtained by applying cement or a resinous substance which solidifies and adheres to the surface of the vessel or by providing a "liner" of similar or different material than the vessel to form an inner shell or outer casing. In using a metallic "liner," a space of varying depth, depending upon specific conditions, is established and may be filled with insulating material, if desired.

Such insulation is frequently used for the double purpose of minimizing heat losses and protecting the chamber walls of vessels employed in thermal conversion processes. In a number of catalytic hydrocarbon conversions the catalyst becomes deactivated by a deposit of carbon and temperatures in the range of 1000° F. to 1500° F. are required to burn off the carbon and regenerate the catalyst. At such temperatures the chamber walls of the vessel deteriorate rapidly. Also, in those conversion processes which involve endothermic reactions, the use of insulation to prevent heat losses is desirable in order to maintain an efficient rate of conversion. Thus it has become desirable and convenient to insulate the interior of the usual metal chamber with an insulating material, preferably of the refractory type. With such material it has become possible to use chambers of relatively inexpensive materials, such as carbon steel, instead of more expensive special metal alloys and still avoid the detrimental effects of high temperatures. Furthermore, the insulation retards heat losses during conversion.

A common source of trouble, however, in the use of internally insulated chambers is the cracking of the insulation and channeling of fluids therethrough. This undesirable cracking is particularly likely to occur in regions around points of attachment of various pieces of structure, such as at connections fastening supports for screens in the case of catalyst beds or in other areas where a continuous solid surface of insulation is interrupted or disturbed. The tendency to crack and channel is especially prevalent in insulated catalyst chambers containing a bed or beds of catalyst since the catalyst presents a hinderance to the flow of fluid which may seek a path of less resistance through cracks which by-pass the catalyst bed. Such an eventuality results in unsatisfactory operation, heat losses through the chamber, and incomplete conversion of the process material. Where a crack is formed it may be widened and lengthened and the insulation loosened from the walls of the chamber by fluids passing through the cracks and between the chamber wall and the insulation or by the contraction and expansion incident to heating and cooling of the chamber, such as may occur between regeneration and conversion steps in catalytic hydrocarbon conversion processes or between reaction and shutdown periods for the chamber. Due to the usual difference in coefficients of expansion between the metallic shell of the vessel and the insulating liner, the tendency of the insulation to become loosened from the chamber wall is increased, even though the shell may not become as hot as the insulation. The formation of fluid-tight insulation liners is further complicated by the tendency of the insulating materials, such as refractory cements, to shrink on setting after being cast in the form of a plastic mass. Experience has shown that with present-day methods of insulation and insulating materials, the insulation tends to crack and permit undesirable escape of fluids from the conversion zone.

It is, therefore, an object of this invention to describe an improvement in the construction of a catalyst chamber.

It is a further object of this invention to provide a mode of insulating a catalyst chamber whereby fluids within the chamber are prevented from escaping catalytic contact by by-passing the catalyst body.

It is a still further object to accomplish the confinement of fluids to the interior of a lined catalyst chamber by introducing steam or other gases into a space between the inside wall of the chamber and the inner lining thereof.

These and other objects and advantages will be apparent from the description which follows with reference to the attached drawings which show a specific embodiment of the invention.

In accordance with this invention, steam or other gas is introduced into a space surrounding the inner insulation or lining in a catalyst chamber and between the inner shell wall and the insulation, under a pressure higher than that of the fluids within the chamber. Thus the fluids are prevented from leaving the chamber or channeling through the insulation by the back pressure of the sealing gas and are thereby caused to traverse the catalyst section of the reaction vessel to obtain the fullest benefits of the catalyst in the process of conversion.

Figure 2:
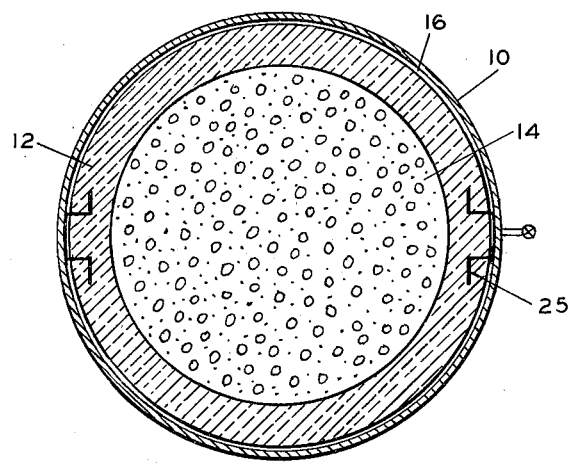

The invention may be more fully described with reference to the accompanying drawings in which Figure 1 is an elevational view of a catalyst chamber showing the improvements of this invention, and Figure 2 is a sectional view taken on line 2—2 of Figure 1.

In the drawings, numeral 10 designates a catalyst chamber which is closed with a cover 11. The vessel is provided with an inner liner 12 of insulating material, preferably of the refractory type, inlet and outlet openings 13 and an enclosed section 14 for the catalyst. If desired, the vessel may be covered with an external layer of insulation (not shown) to provide additional protection against heat losses. Between the inside wall 15 of the vessel and the insulation 12 are annular spaces 16 into which a confining gas, such as steam or other gas, is introduced via line 24 and inlets 17. The insulation may be built up within the chamber with a form that can be raised as the height of the lining increases. The lower section of the chamber supports the lining which is further supported by annular bulkheads 18 which may be fastened to the inner vessel walls and extend into the lining to form partitions for the sections of gas space. Connections from each section to either side of a differential pressure regulator 23 will be necessary, one terminal 19 communicating with the interior of the catalyst bed on a line at or near the middle of the section of gas space being governed and the opposing terminal 20 communicating with the corresponding gas space section.

In operation a pressure differential is maintained between the gas in spaces 16 and the fluids in catalyst space 14 so that the pressure of the gas in spaces 16 is at all times at least slightly higher than that of the fluids in corresponding sections of catalyst. If a readily condensible gas, such as steam, is employed, partial condensation may take place within the spaces 16 and necessitate removal of the liquid as by lines 21 and valves 22.

The pressure differential on the sealing gases above that of the reactant fluids may be maintained manually as desired or automatically by differential pressure regulators 23 which will be sensitive to pressure fluctuations of the reactant fluids or the sealing gases and which will respond to such fluctuations to re-establish the predetermined pressure differences which may satisfactorily be five pounds or less. An increase in the size or number of cracks in the insulation will cause a decrease in the pressure of the sealing gas and an increased amount of this gas will be required to maintain the pressure differential. Thus, the presence of substantial leaks or cracks in the lining may be detected by observing pressure drops in the system or the flow of gas therethrough caused by leakage into the catalyst chamber. With each of the gas sections separately controlled, the region of most extensive cracking in the insulation can be determined from an observation of the controls of each gas section.

The gas may be steam, nitrogen, carbon dioxide, flue gas, hydrocarbons or other gases which will not react detrimentally under the conditions of the process. The gas may desirably be a portion of the fluid being treated. Since the gas is at a higher pressure than that of the fluids within the catalyst section of the chamber, small quantities of the gas will continuously pass through any cracks in the insulation and will pass from the chamber with the effluent from which it may be removed and recirculated as desired. Leakage of relatively small quantities of the gas into the chamber will have no material effect on the reaction. If it is desired to control the temperature of the gas means, such as a restricted orifice, connecting with the gas spaces may be provided to bleed off hot sealing gas as required, replacing it with cool gas.

The insulation may be formed from sections of premolded materials united by heat-resisting cement but preferably, may be monolithic in structure, using suitable refractory cements, such as those sold under the trade-names of Sil-O-Cel, Firecrete, Insulag, Insulcrete, etc. The gas space about the insulation, which may conveniently be about 1" in width, may be a complete unit or may be subdivided as shown into sections each of which has an inlet for the confining gas and means for controlling the pressure as hereinbefore described. The latter arrangement is preferred in usual operations using a bed of solid catalyst where a considerable pressure drop from inlet to outlet of the catalyst chamber is not uncommon. The bulkheads may be inserted in any desirable manner to form gas-tight partitions. With premolded materials the bulkheads may be sealed in at the joints or in grooves prepared to receive them. With cast linings they may be inserted at appropriate places as the casting of the lining progresses. If the pressure drop through the catalyst bed does not exceed that desired for the pressure differential, the gas space may be a single unit without bulkheads forming sections of gas space. In this case only single units of gas inlets, outlets, and differential pressure regulators may be required and the lining may be additionally supported by cleats 25 attached at various points along the inside wall of the vessel and extending into the body of the lining.

The invention is applicable equally to vertical chambers as illustrated, or to horizontal chambers and to chambers of cylindrical, elliptical, or other cross-section. The catalyst may be arranged in a single bed or in several beds as best fitting the particular process.

These and other modifications and changes in the apparatus herein shown and described may be made without departing from the spirit of the invention as defined by the following claim.

I claim:

Apparatus for treatment of fluid materials by contact with solid contact material comprising a chamber having an outer wall, a refractory heat insulating lining member concentric therewith and positioned interiorly thereof being spaced from said outer wall over a major portion of its surface, annular members forming partitions which define a plurality of spaces along the longitudinal axis of the chamber between the outer wall and said lining member, means for introducing fluid material for treatment in the presence of said contact material, means for removing treated fluid material, and differential pressure regulators responsive to fluctuating differences of pressure between catalyst chamber and said spaces and connected in a line communicating with the spaces adapted for supplying gas to maintain a gas in each of said spaces at a local pressure greater than that within the local portion of said bed defined by said partitions.

ALEXANDER R. REHRIG.

REFERENCES CITED

The following references are of record in the file of this patent:

UNITED STATES PATENTS

| Number | Name | Date |
| --- | --- | --- |
| 1,090,874 | Pier | Mar. 24, 1914 |
| 1,286,135 | Somermeier | Nov. 26, 1918 |
| 2,062,358 | Frolich | Dec. 1, 1936 |
| 2,430,652 | Smith | Nov. 11, 1947 |
| 2,431,632 | Brandt | Nov. 25, 1947 |